United States Patent [19]

Hilbush, III

[11] 4,323,526

[45] Apr. 6, 1982

[54] METHOD FOR SEALING PIPE JOINTS

[75] Inventor: Edward O. Hilbush, III, West Chester, Pa.

[73] Assignee: Rubco Products, Inc., West Chester, Pa.

[21] Appl. No.: 155,494

[22] Filed: Jun. 2, 1980

[51] Int. Cl.$^3$ .............................................. B29H 5/06
[52] U.S. Cl. ................................ 264/36; 264/328.13; 285/15; 285/21; 285/297
[58] Field of Search .................. 285/15, 22, 21, 41, 285/294, 297, 293; 264/36, 27, 101, 78, 153, 553, 554, DIG. 46, 65, 70, 328.13; 249/78; 138/97

[56] References Cited

U.S. PATENT DOCUMENTS

| | | | |
|---|---|---|---|
| 2,259,282 | 10/1941 | Williams et al. | 249/78 X |
| 3,178,793 | 4/1965 | Rosengarten et al. | 138/97 X |
| 3,196,488 | 7/1965 | Hinton et al. | 264/DIG. 46 |
| 3,865,662 | 2/1975 | Segal | 264/36 X |
| 3,927,158 | 12/1975 | Croft | 264/36 |
| 4,165,358 | 8/1979 | Johnson | 264/DIG. 78 |

FOREIGN PATENT DOCUMENTS

221764  5/1979  Australia ................. 264/DIG. 65
1166335 10/1969  United Kingdom .

OTHER PUBLICATIONS

"Remedial Procedures for Handling Leakage of Cast Iron Mains", *Ford, Bacon & Davis/West Chester Chemical Co.,* Advertising Brochure, ©1964.

"Keyhole Technique for Externally Sealing Bell and Spigot Joints", W. G. Hickle; *American Gas Journal,* May, 1965.

*Primary Examiner*—Dave W. Arola
*Attorney, Agent, or Firm*—Dann, Dorfman, Herrell and Skillman

[57] ABSTRACT

A method for sealing leaking pipe joints comprises installing and securing a flexible mold around the pipe joint. The pipe joint and the mold are then preheated to within a predetermined temperature range and a chemically settable, flexible fluid sealing material is injected into the mold. The sealing material is cured by maintaining the pipe joint and the interior of the mold within the predetermined temperature range. The injection rate of the sealing material is preferably increased by decreasing the pressure of the interior of the mold. Proper sealing may be facilitated by increasing the pressure within the mold while the sealing material is curing.

5 Claims, 8 Drawing Figures

METHOD FOR SEALING PIPE JOINTS

Field of the Invention

This invention relates generally to a method for the in situ sealing of leaking pipe joints and, more particularly, to an improved method for externally sealing such pipe joints utilizing a fluid plastic sealing material.

Description of the Prior Art

Leaking joints in buried gas pipes, particularly bell and spigot joints in underground cast iron pipes, are a serious matter not only from the standpoint of public safety but also due to the potential loss of the increasingly more expensive gas. Such leaks are inevitable due to various conditions including: uneven settlement of the pipes; deterioration of the original joint sealing media due to the inherent dryness of natural gas; temperature changes which cause uneven expansion and contraction of the pipes relative to each other; ground water penetration; and vibration due to an ever increasing volume of street traffic.

One method of sealing such leaking pipe joints involves blocking off the flow of gas through the line and filling a length of the pipe with a liquid sealing material under pressure. The pressure forces the sealing liquid into the leaking joints from the inside to form tight permanent seals. The excess sealing material is then withdrawn from the length of pipe, the blockages are removed and the gas flow resumes. Although this method is very effective, it cannot be utilized in installations where the gas flow cannot be conveniently interrupted.

A method of externally sealing such leaking pipe joints without any interruption in gas flow has also been successfully employed in the past. This method involves excavating a narrow "keyhole" opening around the leaking joint, clamping an expendable flexible mold around the leaking joint and forcing a fluid sealing material into the mold and consequently into and around the leaking joint. The sealing material is comprised of a chemically-setting flexible material or combination of such materials, such as polysulfidfes, polyeurathanes, coal-tar epoxy mixtures and the like, which bonds securely to the pipe joint and chemically cures to form a tight but flexible permanent seal. Once the curing is completed (after 12 hours to 3 days depending upon the ambient temperature, the size of the pipe joint, etc.), the "keyhole" opening is backfilled.

Although the above-described external sealing method has generally proven to be highly effective in sealing such leaking pipe joints, it is not suitable for use in certain situations. For example, if the leaking pipe joint is located beneath a heavily travelled highway, it may not be feasible to keep open the "keyhole" excavation during the relatively long curing time of the sealing material. In addition, it has been found that the above-described external sealing method may not be totally effective in sealing pipe joints which are subjected to a relatively high pressure (5–25 p.s.i.) since the escaping gas creates bubbles which are entrapped within the sealing material to inhibit or prevent the formation of a perfect seal. It has also been found that this sealing method does not always provide an effective seal when employed in cold weather due to improper or incomplete curing of the sealing material.

It is therefore an object of the present invention to provide an improved method for the in situ sealing of a leaking pipe joint which results in the formation of a permanent, tight-fitting flexible seal in a greatly reduced time period.

It is another object of the present invention to provide such a pipe joint sealing method which is relatively simple to employ and which can be utilized to seal severely leaking pipe joints which are subjected to relatively high pressure during the sealing operation.

SUMMARY OF THE INVENTION

Briefly stated, these objects as well as additional objects and advantages which will become apparent from the following detailed description and the appended drawings and claims are accomplished by the present invention which provides a method for externally sealing a pipe joint. The method comprises installing and securing a flexible mold around the pipe joint and preheating the pipe joint and the interior of the mold to within a predetermined temperature range. A chemically setting elastomeric sealing material is then injected at high pressure into the mold. The temperature of the interior of the mold is maintained within the predetermined temperature range until the sealing material is initially cured. The pressure within the mold preferably is reduced during the injection of the sealing material to assist the injection of the material. The pressure within the mold may be increased during the curing step.

BRIEF DESCRIPTION OF THE DRAWINGS

The foregoing summary as well as the following detailed description of a preferred embodiment of the present invention will be better understood when read in conjunction with the accompanying drawings, in which.

DESCRIPTION OF A PREFERRED EMBODIMENT

Figure 1:
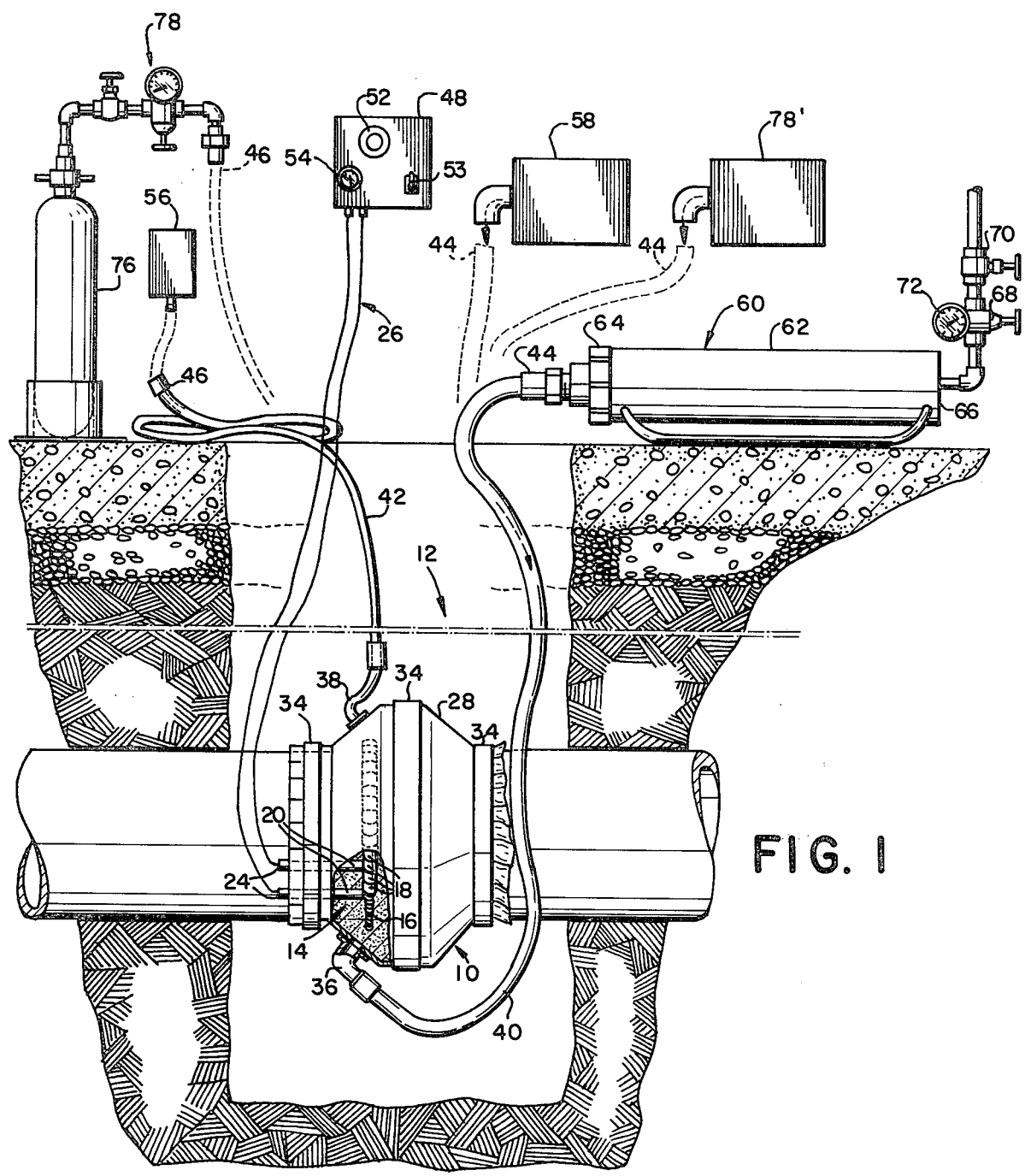
FIG. 1 is a perspective view in partial section of a method of sealing a pipe joint in accordance with the present invention.

Referring to the drawings and particularly to FIG. 1, there is depicted generally a method for sealing a leaking pipe joint 10 in accordance with the present invention. The term pipe joint as used herein refers to a joint or connection of the general type described for any containment rather than specifically to a pipe. The pipe joint 10 in the present embodiment is of the cast iron bell and spigot type which is typically employed for transporting natural gas under pressure in underground pipe lines. Such natural gas pipes are typically buried under a road surface as shown. Before the leaking pipe joint 10 may be sealed, it is necessary to excavate the area around the joint to provide free access to the exterior of the leaking pipe joint as shown. This can be accomplished, for example, by means of a "keyhole" excavation 12 in a manner which is well known in the art. Once the leaking pipe joint is completely exposed as shown, it should be thoroughly cleaned, preferably by chipping and sandblasting (not shown), in order to remove all dirt or other particles which may have become attached to the pipe joint.

Figure 2:
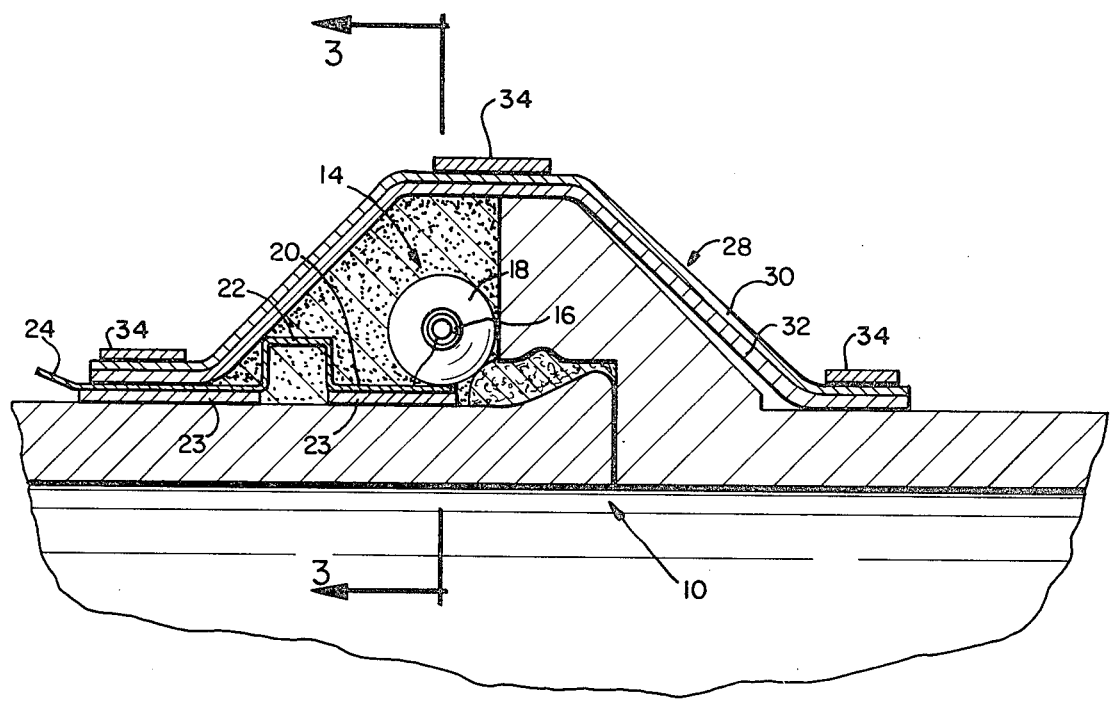
FIG. 2 is an enlarged sectional view of the pipe joint portion of FIG. 1.
Figure 3:
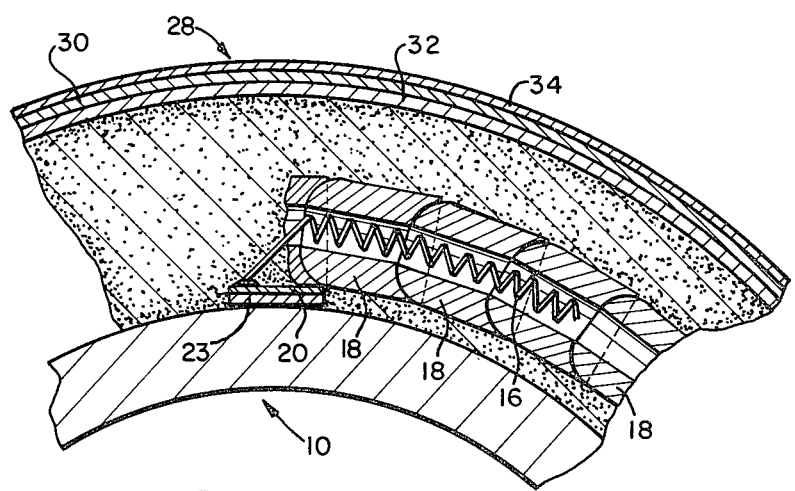
FIG. 3 is a sectional view taken along line 3—3 of FIG. 2.

In order to provide an effective seal for the leaking joint in accordance with the invention, means is provided to apply heat to the joint during the sealing procedures. After the pipe joint 10 has been cleaned, a heating element shown generally as 14 is installed around the spigot pipe proximate the pipe joint 10 (as shown in FIGS. 1 and 2). The heating element 14, whose purpose will hereinafter become apparent, should be positioned on the spigot axially within one-half inch of the bell of the pipe joint.

In the present embodiment, the heating element 14 is of the electrical resistance type and is comprised of a suitably sized coil of nichrome wire, for example 15 gauge wire 16, encased within an insulated sleeve comprised of the central openings of a plurality of ball and socket type porcelain spacers 18. Any other suitable type of heating element may be employed; however, the heating element must be of a type which will not create an arc or wire temperature in excess of 500° F. since it will be operated immediately adjacent to the leaking gas pipe joint.

Extending axially along the spigot pipe and attached to the respective ends of the nichrome wire 16 are a pair of electrical conductor strips 20 (only one strip being shown in FIG. 2 for clarity). The conductor strips 20 may be made out of copper or any other suitable electrical conductor and for purposes which will hereinafter become apparent, each conductor strip 20 includes an offset or bridge portion 22 as shown in FIG. 2. A suitable electrical insulator that will adhere to the conductor strips 20, for example, an epoxy coating 23, is applied to the bottom of the conductor strips 20 to prevent them from short circuiting to each other through their contact with the cast iron pipe. The end of each conductor strip 20 includes an outwardly extending lug 24 to facilitate connecting a pair of wires 26 of the connector strips 20 in order to deliver electrical current through the conductor strips 20 to the nichrome wire 16.

An expendable flexible mold 28 capable of withstanding the high pressures within the pipe, which for example may be as high as 90 to 100 psig, is installed in place around the pipe joint 10 to enclose both the pipe joint and the heating element 14. The mold 28 includes an outer impervious layer 30 comprised of, for example fabric impregnated with neoprene, or any other suitable flexible material. Bonded to the outer mold layer 30 is an inner thermal insulated layer 32 comprised of a closed cell foam or sponge rubber, for example, urethane foam insulation, which also serves as a gasket to provide a tight seal between the mold 28 and the exterior surfaces of the pipes. The axial ends of the mold 28 are suitably tapered and tucked (as shown) in order to allow for a tight fit around the cast iron pipes. The mold 28 is positioned axially as shown in FIGS. 1 and 2 so that the conductor strip lugs 24 remain exposed. The mold 28 is secured in place around the pipe joint by means which may be, for example, three steel bands 34.

The mold 28 is provided with a pair of fittings 36 and 38 which are suitably connected respectively to an inlet conduit 40 and an outlet conduit 42. The inlet and outlet conduits 40 and 42 in this embodiment are in the form of clear, polyethylene tubes which extend upwardly to the ground surface. The other end of each of the conduits 40 and 42 contain suitable fittings 44 and 46 respectively to facilitate connection/connection from various devices to be described in detail below.

Referring now to FIGS. 1 and 4, once the mold 28 has been installed as described above, the interior of the mold 28 and the pipe joint 10 are preheated to a predetermined temperature range, for example, between 110° F. and 130° F., which is the preferred temperature range for accelerated curing of the sealing material. The preheating is accomplished by passing an electrical current through the heating element 14. The electrical current is provided by an adjustable electrical source 48 and is supplied to the heating element 14 by wires 26 which run between the electrical source 48 and the connector strip lugs 24 as shown in FIG. 4a. An adjustment knob 52 which operates a variable voltage control (not shown) or any other suitable current regulating device and an ammeter 54 on the front panel of the electrical source 48 are utilized to accurately regulate the current supplied to the heating element 14. A switch 53 on the front panel of the electrical source 48 is used to turn the flow of current on and off. Initially, a high level of current, for example, 6 amps, is supplied to the heating element 14 to apply heat to the pipe joint 10. It will be understood, however, that the current flowing through the heating element 14 will vary with the size of the nichrome wire 16 which is employed, and should be regulated to keep the wire temperature below 500° F. The insulated inner mold layer 32 helps to retain the generated heat inside the mold 28 in order to speed up the preheating process.

Concurrently with the preheating of the mold 28, a vacuum source, for example a vacuum pump 56, is attached to the free end of the outlet conduit 42. The vacuum pump applies a vacuum at a level sufficient to eliminate from the interior of the mold 28 any gas which may be leaking through the pipe joint and to contract the mold 28 tightly inwardly around the pipe joint 10. By contracting the mold 28 tightly around the pipe joint in this manner, the insulated mold layer 32 retains the generated heat more effectively and there is less volume within the mold interior. The contracted mold also acts to channel the sealing material directly against the bell and spigot area of the pipe joint. The vacuum pump 56 also acts to scavenge cold air from around the pipe joint 10.

Figure 4A:
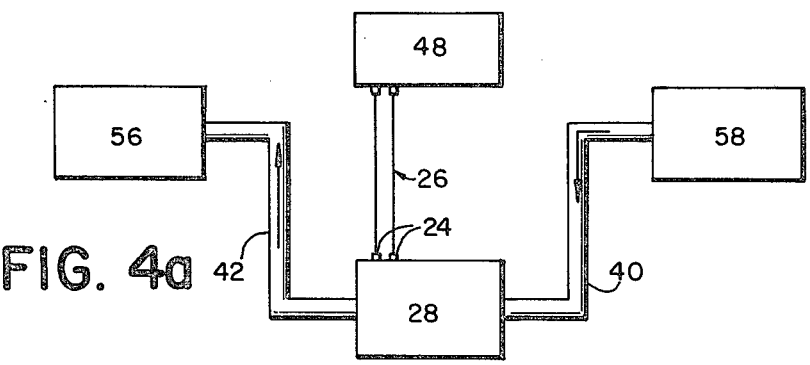
FIGS. 4a–e are block diagram representations depicting the various steps of the pipe joint sealing method of FIG. 1.

In order to further supplement the heating element 14 in preheating the pipe joint and the interior of the mold 28, the inlet conduit 40 may be connected to a hot air source 58 as shown in phantom on FIG. 1 and diagrammatically in FIG. 4a. Heated air having a temperature of between 110° F. and 140° F. from the hot air source 58 is thereby drawn by the vacuum pump 56 through the inlet conduit 40 and into the interior of the mold 28. The temperature of the heated air must be regulated to insure that it does not melt or otherwise adversely affect the inlet conduit 40 or the mold 28.

In order to determine when the pipe joint and mold interior are preheated to the proper temperature, the temperature of the air withdrawn from the mold 28 by the vacuum pump 56 may be monitored by placing a suitable thermometer means (not shown) in the outlet conduit 42. Ideally, the temperature of the pipe joint and the interior of the mold should be within the temperature range required to start the chemical reaction to initiate curing of the sealing material being employed, for example, 110°–130° F. If, after an initial period of time the temperature of the air as measured in the outlet conduit 42 has not reached at least the minimum temperature in the range, it may be because the vacuum pump 56 is drawing too much unheated ambient air into the mold 28 through the inlet conduit 40. By decreasing the vacuum applied, the flow of unheated air into the mold 28 is reduced and the measured temperature will again begin to rise.

Figure 4B:
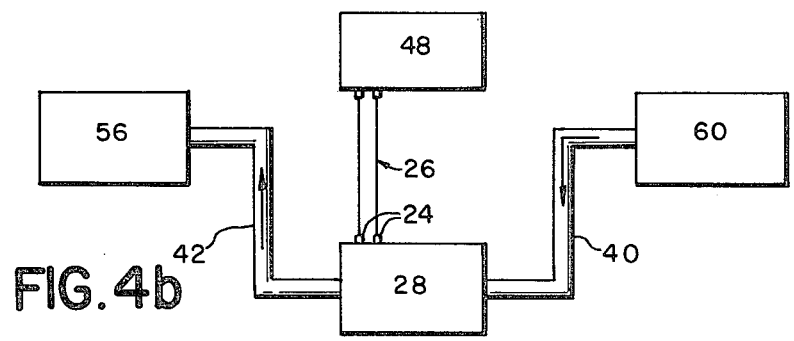

When the temperature of the pipe joint and the interior of the mold 28 reaches the minimum temperature required to start the chemical reaction to start curing of the sealing material being employed, the inlet conduit 40 is disconnected from the hot air source 58 and is connected, as shown in FIG. 4b, to an apparatus 60 for dispensing fluid sealing material under high pressure. The dispensing apparatus 60 may be comprised of a tubular cylindrical member 62 having a first end which includes closure means 64 for retaining the sealing material within the cylindrical means 62 and for dispensing a portion of the sealing material therethrough. The second end of the cylindrical member 62 includes closure means 66 for receiving a flow of pressure fluid, for example compressed air, from a source which may be, for example, a gasoline motor-driven compressor (not shown). An adjustable control valve 68, a shut-off valve 70 and a pressure indicating gauge 72 are interposed between the pressure source and the cylindrical member 62 in order to control the pressure of the fluid applied to the cylindrical member. A piston (not shown) within the interior of the cylindrical member 62 operates in response to the fluid pressure to dispense a high pressure regulated flow of fluid sealing material out of the closure means 64 through the inlet conduit 40, and into the mold 28. The flow of the sealing material into the mold 28 is assisted by the vacuum pump 56, which cooperates to rapidly draw the sealing material into the mold 28. For example, by employing the vacuum pump 56, the flow rate of sealing material into a mold employed to seal a pipe joint six inches in diameter may be on the order of four gallons per minute, thereby filling the mold with the requisite one gallon of sealing material in as little as fifteen seconds. It has been found that by injecting the sealing material into the mold at such a high flow rate, the possibility of leaking gas bubbles being encapsulated in the sealing material is eliminated or greatly reduced, thereby allowing for an improved seal.

The sealing material employed in conjunction with the present invention is comprised of a chemically settable flexible material or combination of such materials, such as polysulfides, polyeurethanes, coal-tar epoxy mixtures or the like, which does not become hard or brittle but remains flexible to form a resilient seal after chemical curing. The sealing material bonds securely to cast iron pipes and will not corrode or significantly deteriorate with time. The chemical curing is an exothermic reaction, the speed of which is significantly increased at an elevated temperature.

As the sealing material flows into the mold 28, it spreads out to encompass the entire mold interior, some of the sealing material actually entering the bell and spigot pipe joint 10. Due to the conductor strip bridge portion 22, the sealing material completely engulfs and encloses the conductor strips 20 particularly under the bridge portion 22 to form a continuous plug of sealing material to prevent any gas leakage between the strips and the underlying pipe.

Once the sealing material begins to flow into the mold 28, the current flow to the heating element 14 may be decreased to approximately 3-4 amps. The desired curing temperature within the mold is thereafter maintained by the reduced current through the heating element 14 in combination with the heat which is generated by the exothermic curing process.

Figure 4C:
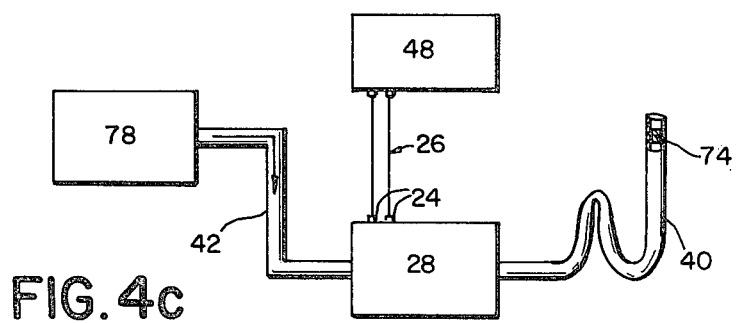

When the mold 28 is filled with sealing material, (evidenced by the appearance of sealing material in the outlet conduit 42), the outlet conduit 42 is removed from the vacuum pump 56 and is connected to a back pressure regulator 78 (see FIG. 4c). The back pressure regulator 78 may comprise suitable valving and indicating means which is connected to a suitable source of fluid pressure, for example, a pressurized air tank 76. The back pressure regulator 78 increases the pressure within the outlet conduit 42 until the outlet conduit pressure equalizes with the inlet conduit pressure (which has been maintained by the dispensing apparatus 60). The back pressure which is applied to the interior of the mold 28 is effective to force the sealing material into the leaking pipe joint and to keep it in place until it is set.

Figure 4D:
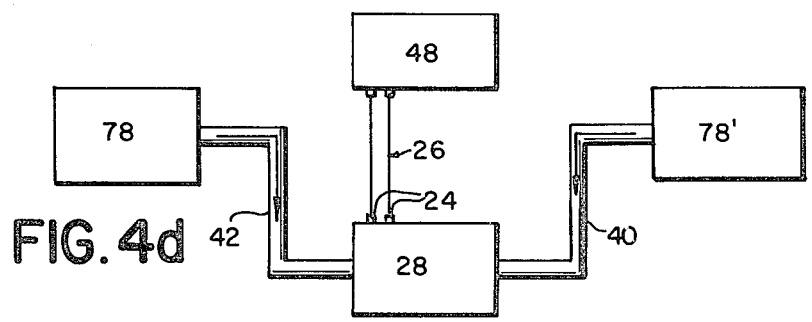

Once the outlet conduit and inlet conduit pressures equalize, the inlet conduit 40 is temporarily crimped as shown in FIG. 4c and is disconnected from the dispensing apparatus 60. A conduit sealing member or plug 74 is then inserted into the end of the crimped inlet conduit 40 (as shown in FIG. 4c), and the end of the inlet conduit 40 is connected to a pressure regulator shown schematically as 78' (as shown in FIG. 4d). The pressure regulator 78' may comprise suitable valving and indicating means which is connected to a suitable source fluid pressure (not shown). The temporary crimp in the inlet conduit is then removed and the pressure in the mold 28 is maintained at a constant, equalized level (equal to or greater than the pressure level within the pipe joint) by the back pressure regulator 78 and the pressure regulator 78' until the sealing material has initially cured.

Figure 4E:
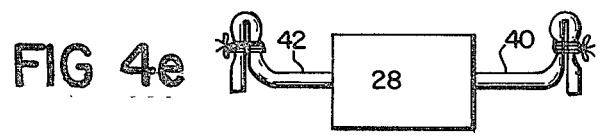

When the sealing material has initially cured, the inlet and outlet conduits 40 and 42 are disconnected respectively from the pressure regulator 78' and the back pressure regulator 78 and the ends thereof are suitably sealed off, for example, by tying off the ends as shown in FIG. 4e. The current may be turned off and the electrical wires 26 may be removed from the connector strip lugs 24 as also shown in FIG. 4e.

The chemical curing of the sealing material continues of its own accord until it is naturally completed. The "keyhole" excavation may then be filled in and the road surface may be suitably patched or otherwise repaired. In this manner, the entire process of sealing the pipe joint may be accomplished in approximately one and one-half hours instead of the three days which was required utilizing the prior art method.

From the foregoing description, it can be seen that the present invention provides an improved method for sealing pipe joints utilizing a fluid sealing material. The method is relatively simple to employ and may be utilized to effectively seal severely leaking pipe joints which are subjected to relatively high pressure during the sealing operation.

It will be recognized by those skilled in the art that changes may be made to the above-described embodiment of the invention without departing from the broad inventive concepts thereof. For example, the pipe joint and the mold 28 may be preheated and/or maintained within the predetermined temperature range utilizing a variety of alternative means including: hot air blowers providing heated air to the inner or outer surface of the mold; high intensity heat lamps supplying heat to the mold exterior; or electrically conductive heat type wrapped around the pipe joint or mold exterior. Alternatively, the pipe joint and mold interior heat may be provided by induction heating utilizing an electric arc welder suitably connected across the pipe joint. It is also possible to utilize the above-described pipe sealing method without heating the mold interior when rapid curing of the sealing material is not necessary. It is understood, therefore, that this invention is not limited to the particular embodiment disclosed, but it is intended to cover all modifications which are within the scope and spirit of the invention as defined in the appended claims.

I claim:

1. A method for sealing a pipe joint comprising:
   installing an electrical resistance heating element around the pipe the joint, said heating element being detachably connected to a source of electricity;
   installing and securing a flexible mold around the pipe joint to enclose the heating element within the mold cavity;
   heating the pipe joint and the interior of the mold cavity to a predetermined temperature range by causing a current to flow through said heating element;
   injecting a chemically settable, flexible sealing material into the mold cavity, said sealing material having an accelerated curing rate within said predetermined temperature range;
   curing the sealing material by maintaining the temperature of the interior of the mold cavity within the predetermined temperature range at least until the sealing material has initially cured; and
   detaching said element from said source.

2. The method as recited in claim 1 further including the step of reducing the pressure within the mold while the sealing material is being injected.

3. The method as recited in claims 1 or 2 further including the step of preheating the mold cavity with heated air prior to injecting said sealing material and reducing the pressure within the mold cavity while the mold is being preheated.

4. The method as recited in claims 1 or 2 further including the step of increasing the pressure within the mold above the pressure within the interior of the pipe joint while the sealing material is curing.

5. A method for sealing a pipe joint comprising:
   installing an electrical resistance heating element around the pipe proximate the male side of the joint, said heating element being detachably connected to an adjustable source of electricity;
   installing and securing a flexible mold around the pipe joint to enclose the heating element therein, said mold including a first and a second conduit extending therefrom;
   attaching said first conduit to a source of heated air, attaching said second conduit to an operating vacuum pump and causing a current to flow through said heating element thereby applying heat to the pipe joint and the interior of the mold and causing flow of heated air through the interior of the mold;
   removing said first conduit from said hot air source after the pipe joint and the mold interior reach a predetermined temperature range;
   attaching said first conduit to an apparatus for dispensing a chemically settable flexible sealing material;
   dispensing said sealing material through said first conduit and into said mold;
   removing said second conduit from said vacuum pump and applying a first pressure to the sealing material in the mold after said mold is filled with said sealing material;
   removing said first conduit from said sealing material source and installing a sealing member therein;
   applying a second pressure to said first conduit and said sealing member to maintain the interior of said mold under pressure;
   removing said first and second conduits from said pressure sources and disconnecting said source of electricity when said sealing material has initially cured; and
   sealing off said first and second conduits.

* * * * *